US009459130B2

(12) United States Patent
Bradshaw et al.

(10) Patent No.: US 9,459,130 B2
(45) Date of Patent: Oct. 4, 2016

(54) SYSTEM FOR MEASURING A LIQUID LEVEL AND ORIENTATION

(71) Applicant: Deere & Company, Moline, IL (US)

(72) Inventors: Christopher L. Bradshaw, Sherard, IL (US); Christopher D. Turner, Waterloo, IA (US); Michael J. Pipho, Dunkerton, IA (US); Bruce L. Upchurch, Waterloo, IA (US)

(73) Assignee: DEERE & COMPANY, Moline, IL (US)

( * ) Notice: Subject to any disclaimer, the term of this patent is extended or adjusted under 35 U.S.C. 154(b) by 381 days.

(21) Appl. No.: 14/079,092

(22) Filed: Nov. 13, 2013

(65) Prior Publication Data

US 2015/0130930 A1    May 14, 2015

(51) Int. Cl.
*H04N 7/18* (2006.01)
*H04N 9/47* (2006.01)
*G01F 23/00* (2006.01)

(52) U.S. Cl.
CPC ....... *G01F 23/0076* (2013.01); *G01F 23/0069* (2013.01)

(58) Field of Classification Search
None
See application file for complete search history.

(56) References Cited

U.S. PATENT DOCUMENTS

| | | | |
|---|---|---|---|
| 4,286,464 A | 9/1981 | Tauber et al. | |
| 4,606,226 A | 8/1986 | Krohn | |
| 5,381,022 A | 1/1995 | Nemeth et al. | |
| 6,098,029 A | 8/2000 | Takagi et al. | |
| 6,225,125 B1 | 5/2001 | Lapidus | |
| 6,448,574 B1* | 9/2002 | Chow | G01F 23/292 250/577 |
| 6,915,689 B2* | 7/2005 | Edvardsson | H01Q 1/22 324/637 |
| 7,109,512 B2 | 9/2006 | Wirthlin | |
| 7,597,000 B2 | 10/2009 | Bell et al. | |
| 7,982,201 B2 | 7/2011 | Bryant et al. | |
| 8,184,848 B2 | 5/2012 | Wu et al. | |
| 8,823,778 B2 | 9/2014 | Endo | |
| 9,038,442 B2 | 5/2015 | Reimer et al. | |
| 2002/0152809 A1* | 10/2002 | Shirai | C23C 16/4482 73/299 |
| 2004/0011127 A1* | 1/2004 | Huemer | F04B 1/00 73/302 |
| 2004/0173021 A1* | 9/2004 | Lizon | G01F 23/2961 73/290 V |
| 2006/0288776 A1* | 12/2006 | Pelovitz | A47J 31/4457 73/304 C |
| 2007/0227272 A1 | 10/2007 | Northrop | |
| 2008/0022768 A1* | 1/2008 | Bell | G01F 23/02 73/323 |
| 2008/0143828 A1 | 6/2008 | Mandrachia et al. | |
| 2008/0304082 A1* | 12/2008 | Gotz | G01F 23/292 356/614 |

(Continued)

FOREIGN PATENT DOCUMENTS

EP    1752743 A1    2/2007
EP    2015035 A1    1/2009

*Primary Examiner* — Frederick Bailey
*Assistant Examiner* — Talha M Nawaz

(57) ABSTRACT

A system including a container, an imaging structure, an image capturing device, and a processor. The container at least partially surrounds a liquid. The liquid has a liquid surface that is defined by a quantity of the liquid in the container, a shape of the container, and an orientation of the container relative to a horizontal plane. The imaging structure is positioned in the container. The image capturing device captures an image of the liquid surface and the imaging structure. The processor is in communication with the image capturing device for analyzing a characteristic of the image, and for determining an attribute therefrom.

18 Claims, 9 Drawing Sheets

(56) References Cited

U.S. PATENT DOCUMENTS

| | | | |
|---|---|---|---|
| 2010/0258575 A1 | 10/2010 | Fang et al. | |
| 2010/0286933 A1* | 11/2010 | Boa | G01F 23/265 |
| | | | 702/55 |
| 2010/0322462 A1* | 12/2010 | Wu | G06K 9/00 |
| | | | 382/100 |
| 2011/0056290 A1* | 3/2011 | Bryant | G01F 23/292 |
| | | | 73/293 |
| 2011/0077876 A1* | 3/2011 | Ellingsen | B01L 3/0293 |
| | | | 702/55 |
| 2011/0268329 A1 | 11/2011 | Pronkine | |
| 2012/0018037 A1* | 1/2012 | Nakagawa | C23C 16/4482 |
| | | | 141/67 |
| 2012/0096939 A1* | 4/2012 | Mokander | G01F 23/2961 |
| | | | 73/290 V |
| 2013/0216673 A1* | 8/2013 | Storek | A47J 27/62 |
| | | | 426/509 |

\* cited by examiner

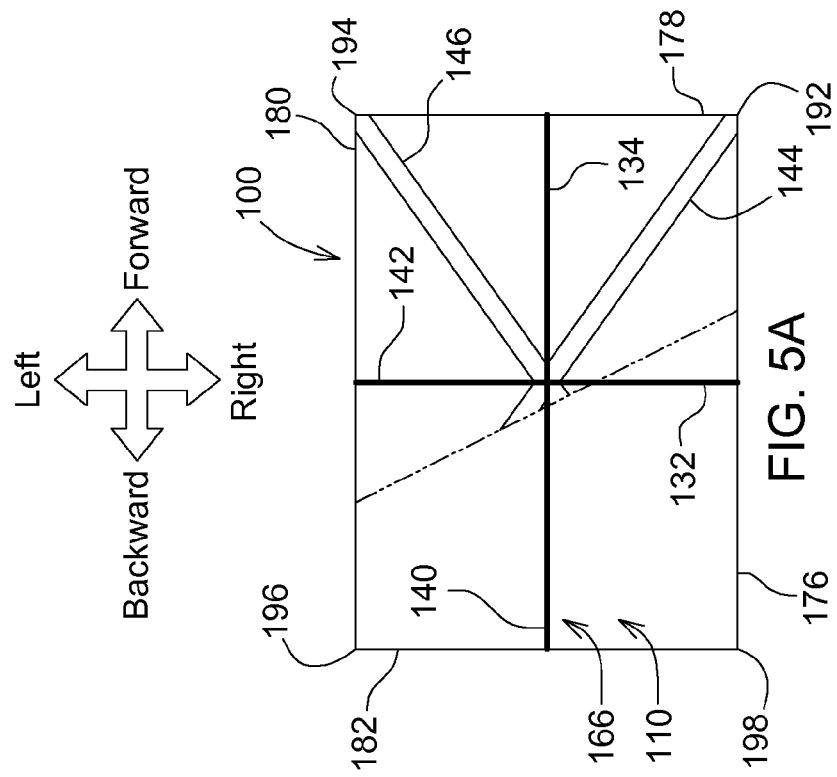
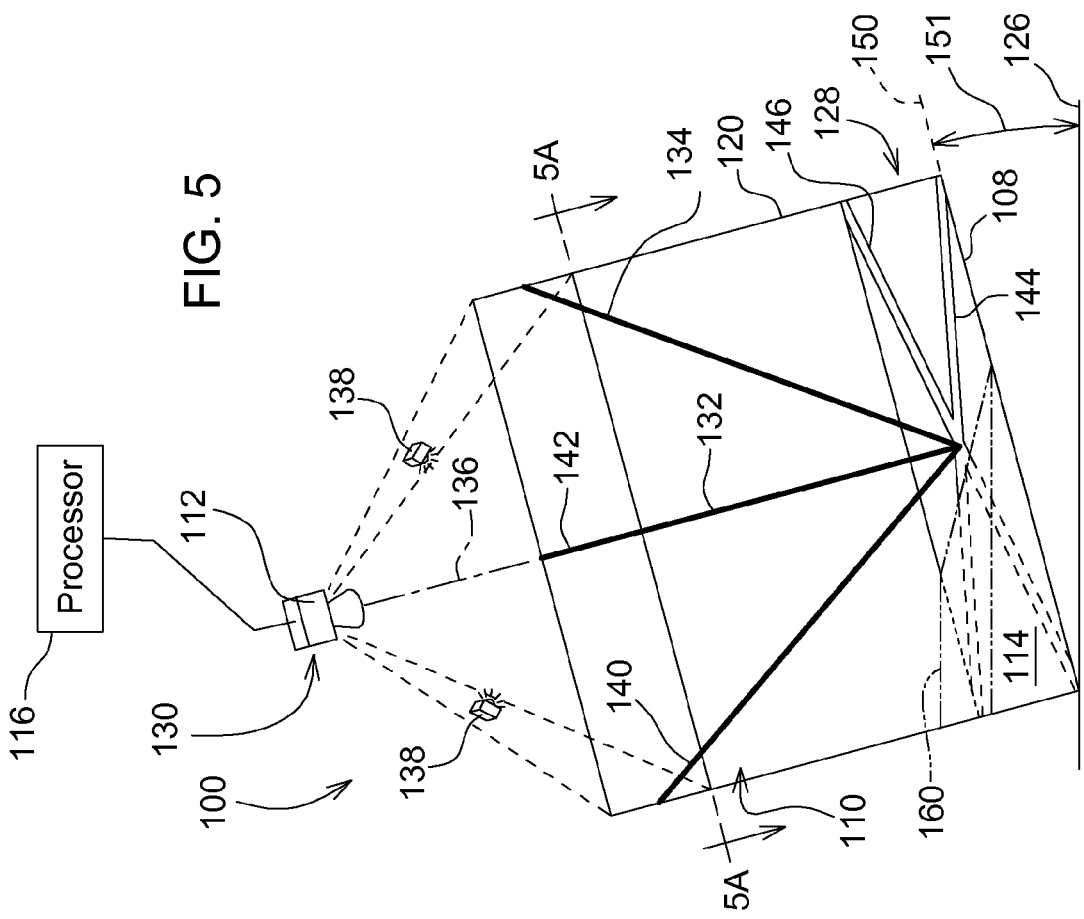
FIG. 5

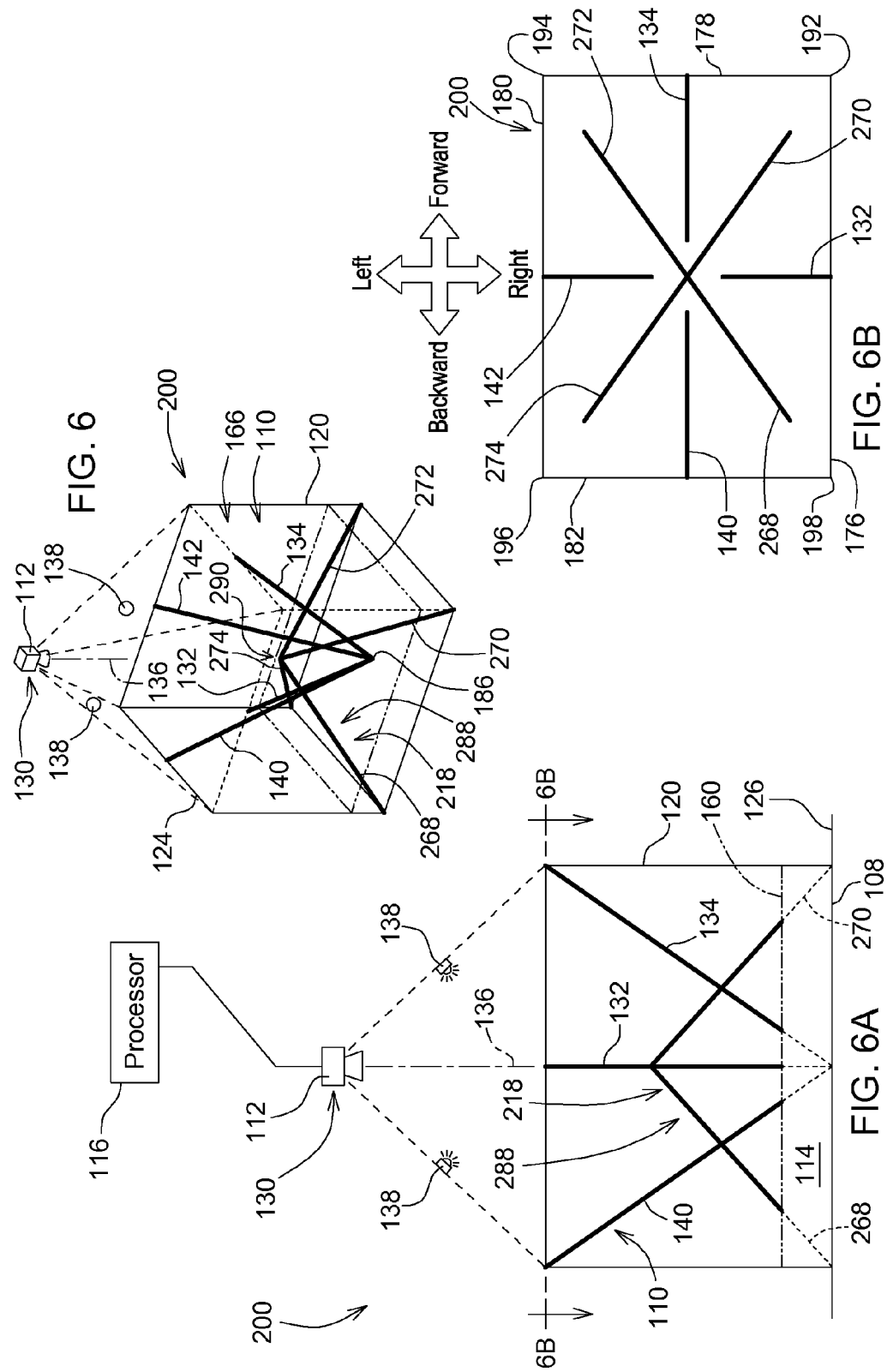

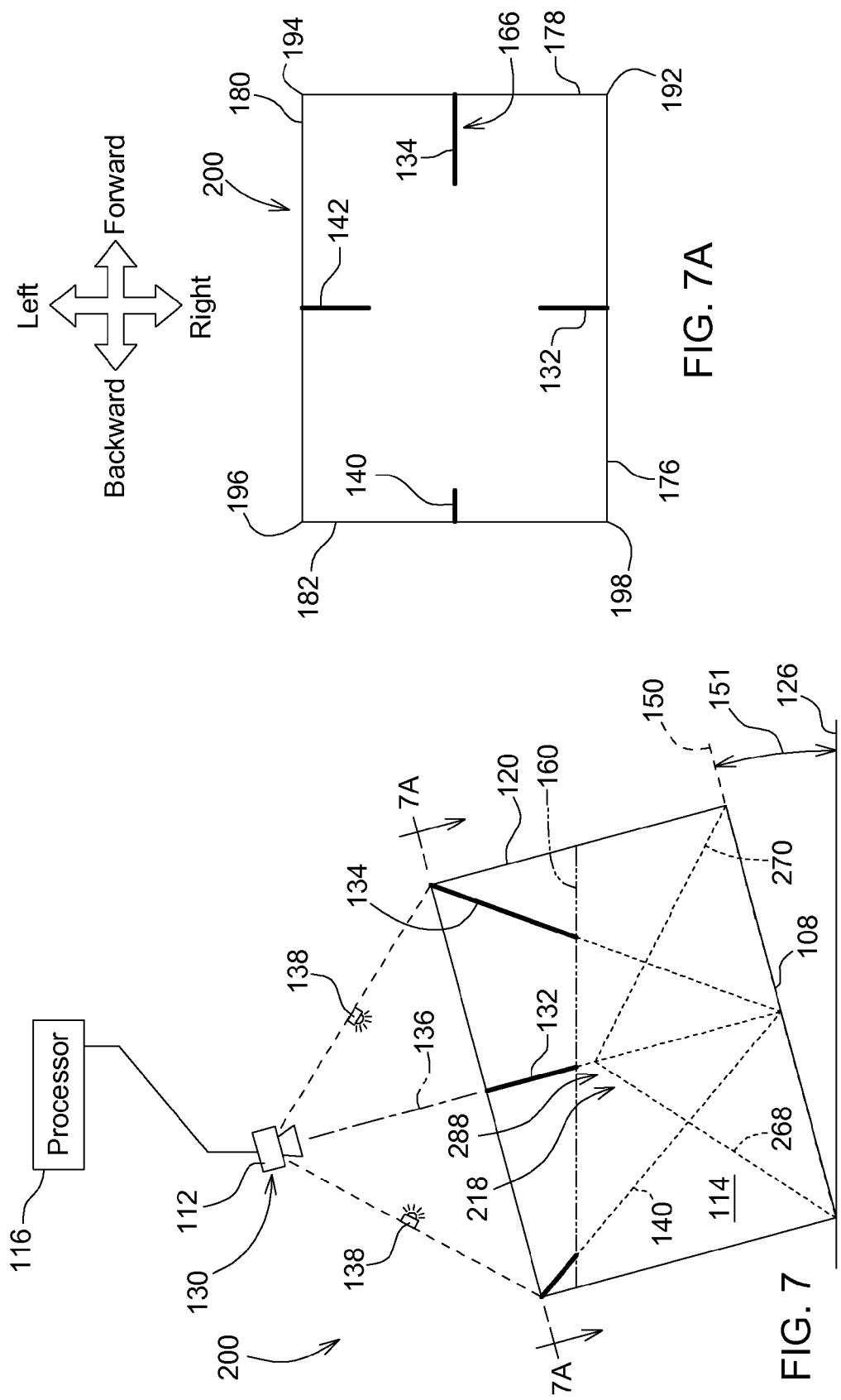

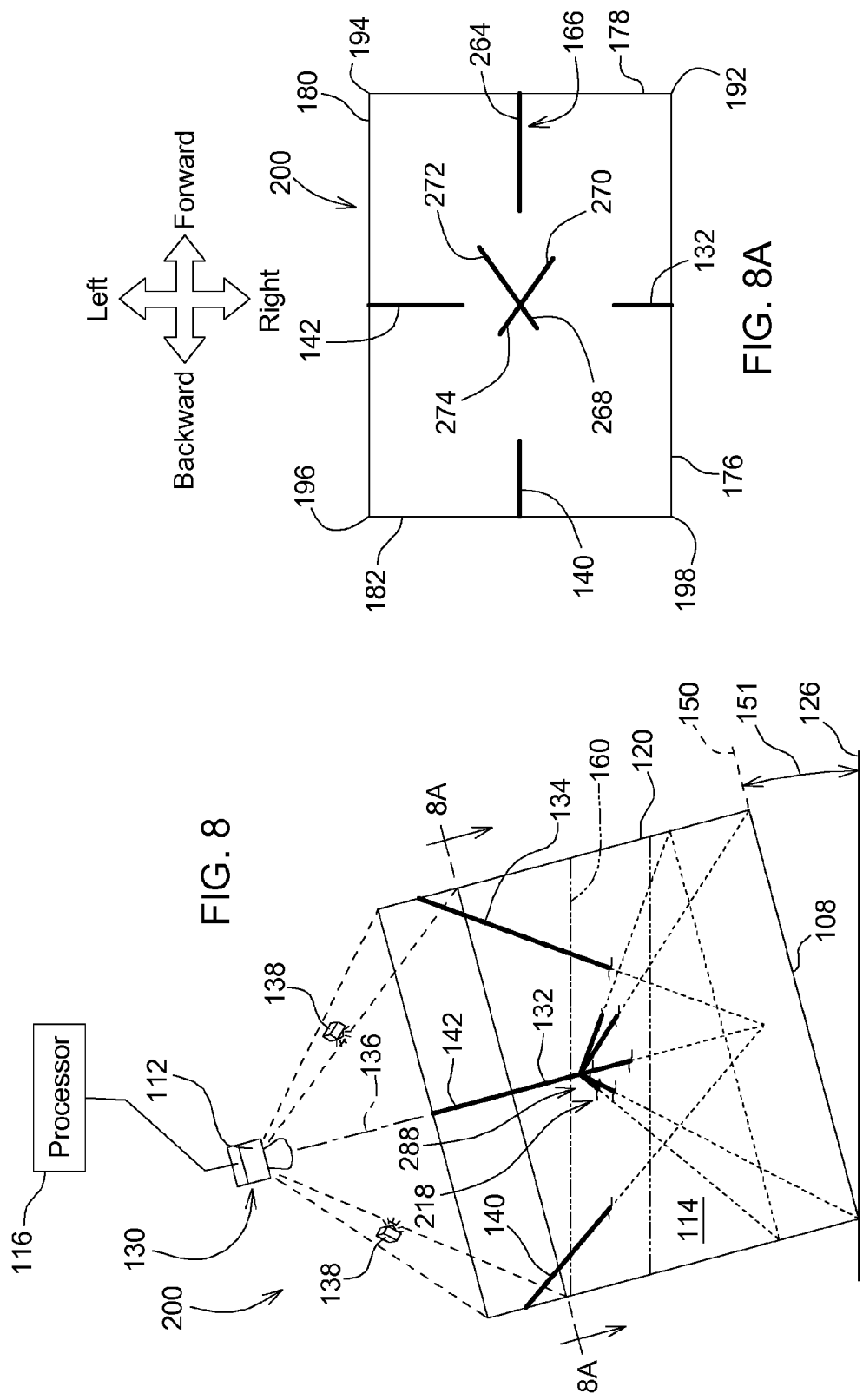

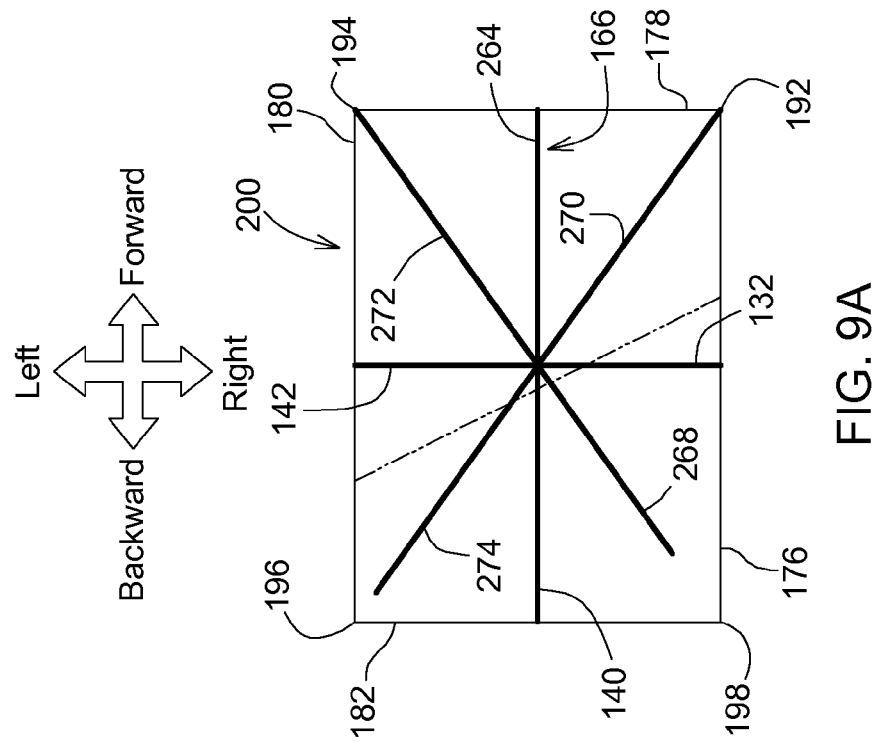
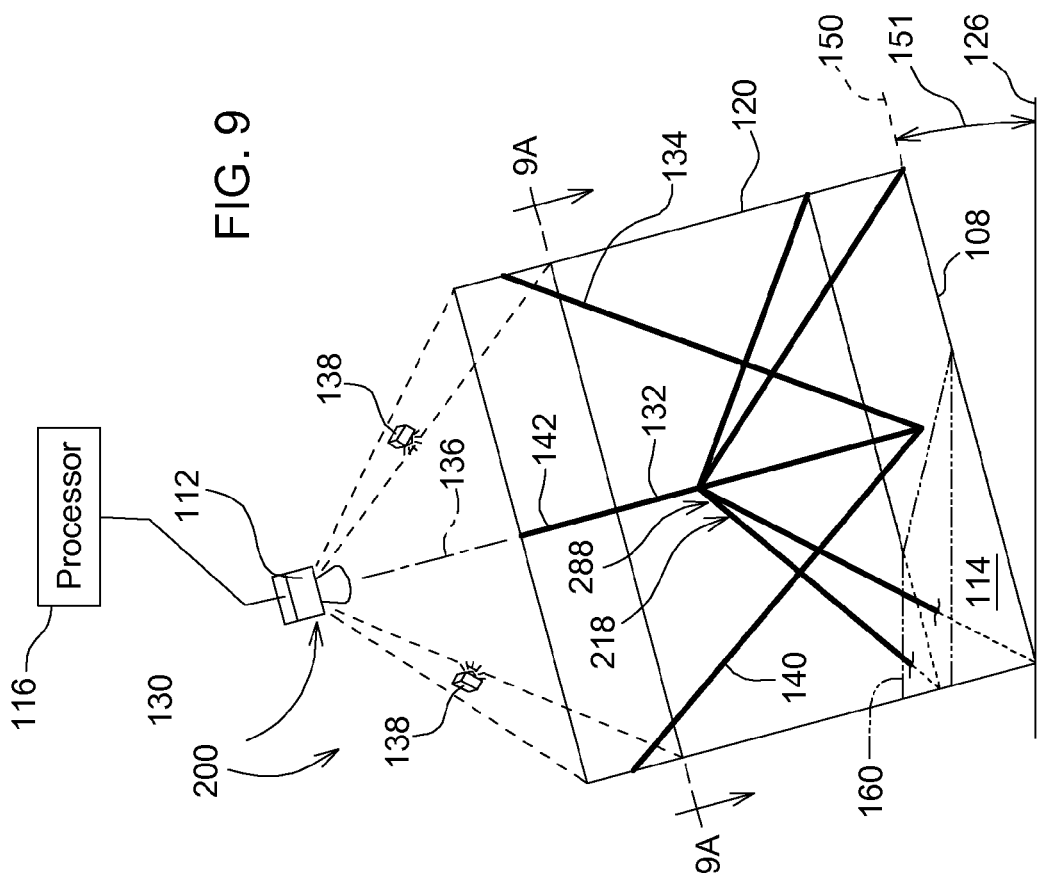

SYSTEM FOR MEASURING A LIQUID LEVEL AND ORIENTATION

FIELD OF THE DISCLOSURE

The present disclosure relates to a system for measuring a liquid level and orientation.

BACKGROUND OF THE DISCLOSURE

The technology used in known liquid level sensors has issues limiting performance and reliability. For example, float level sensors can become lodged or lose buoyancy. As a further example, sonic "time of flight" sensors have an off axis range that is limited to an order of 30 degrees, and the variations in the fluid can affect the speed of sound through the fluid and, thus, the accuracy of the sensor. As yet a further example, capacitance level sensors can measure inaccurately as a result of variations in the fluid.

SUMMARY OF THE DISCLOSURE

Disclosed is a system including a container, an imaging structure, an image capturing device, and a processor. The container at least partially surrounds a liquid. The liquid has a liquid surface defined by a quantity of the liquid in the container, a shape of the container, and an orientation of the container relative to a horizontal plane. The imaging structure is positioned in the container. The image capturing device captures an image of the liquid surface and the imaging structure. The processor, which is in communication with the image capturing device, analyzes a characteristic of the image and determines an attribute therefrom.

BRIEF DESCRIPTION OF THE DRAWINGS

The detailed description of the drawings refers to the accompanying figures in which:

FIG. 2A is an elevational view of the first system being shown in a level position and having a low level of liquid therein;

FIG. 2B is a top sectional view taken along lines 2B of FIG. 2A, showing a top view of a container and the liquid therein;

FIG. 3A is a top sectional view taken along lines 3A of FIG. 3, showing a top view of the container and the liquid therein;

FIG. 4A is a top sectional view taken along lines 4A of FIG. 4, showing a top view of the container and the liquid therein;

FIG. 5 is a side view of the first system being shown in an upward and rightward position and having a low level of liquid therein;

FIG. 5A is a top sectional view taken along lines 5A of FIG. 5, showing a top view of the container and the liquid therein;

FIG. 6 is a perspective view of the second system being shown in a level position and having a low level of liquid therein;

FIG. 6A is an elevational view of the second system being shown in a level position and having a low level of liquid therein;

FIG. 6B is a top sectional view taken along lines 6B of FIG. 6A, showing a top view of the container and the liquid therein;

FIG. 7 is an elevational view of the second system being shown in an upward position and having a medium level of liquid therein;

FIG. 7A is a top sectional view taken along lines 7A of FIG. 7, showing a top view of the container and the liquid therein;

FIG. 8 is a side view of the second system being shown in an upward and rightward position and having a medium level of liquid therein;

FIG. 8A is a top sectional view taken along lines 8A of FIG. 8, showing a top view of the container and the liquid therein;

FIG. 9 is a side view of the second system being shown in an upward and rightward position and having a low level of liquid therein; and FIG. 9A is a top sectional view taken along lines 9A of FIG. 9, showing a top view of the container and the liquid therein.

DETAILED DESCRIPTION OF THE DRAWINGS

Figure 1:
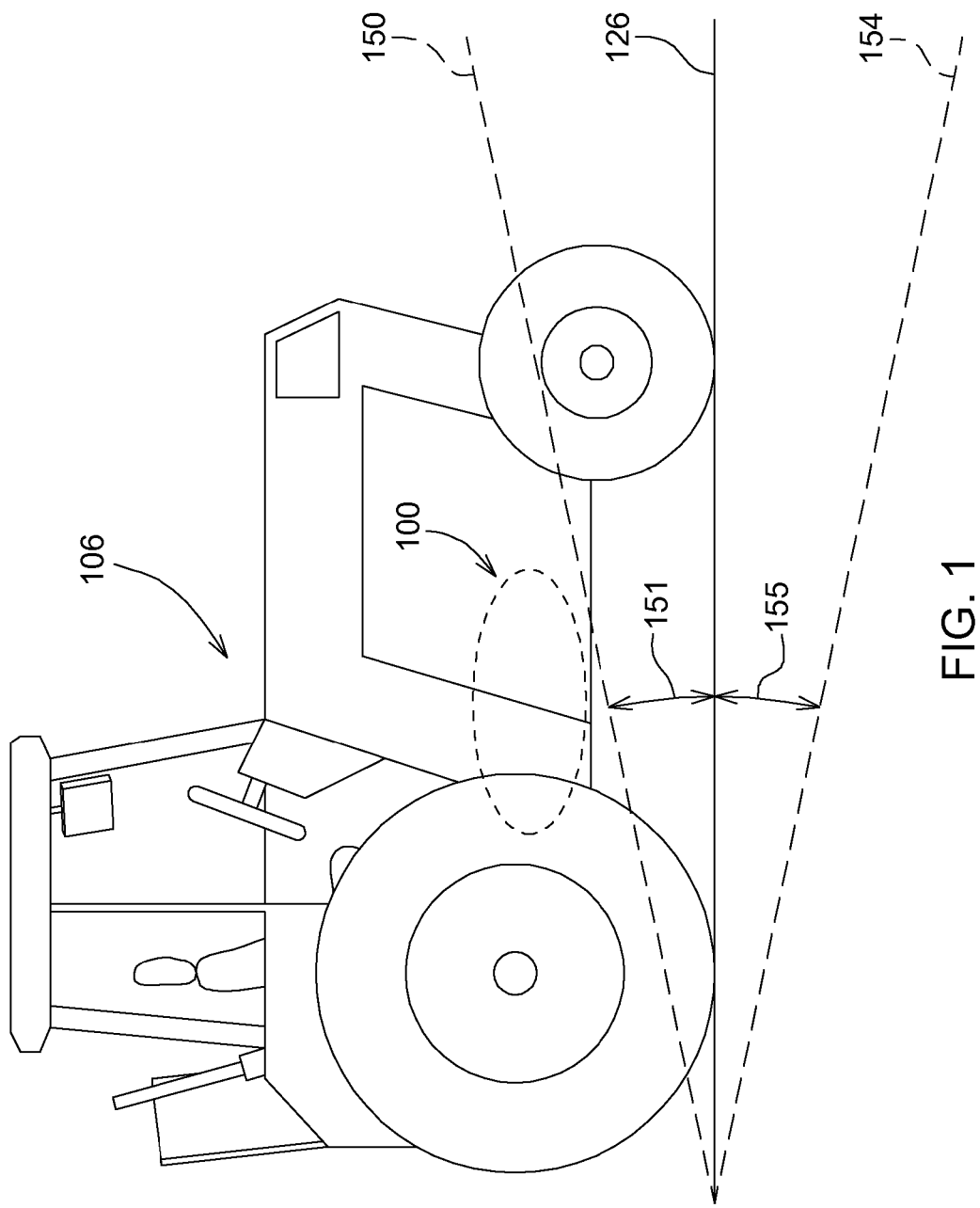
FIG. 1 is schematic view of a machine having a first system for measuring a liquid level and a liquid orientation, the first system being shown in a level position.

Referring to FIG. 1, there is shown a machine 106 having a first system 100 for measuring at least one of a quantity and an orientation of a liquid 114 (as shown in FIGS. 2-9). The machine 106 is shown in a level position and on a horizontal plane 126. The machine 106 may be, for example, an agricultural tractor (as illustrated), a construction machine, an automobile, a truck, a gen-set or any other kind of machine having a liquid thereon. The liquid 114 may be, for example, a fuel (such as gasoline or diesel fuel), a coolant, a lubricant, a diesel exhaust fluid, or any other kind of liquid that may be present on a machine.

Shown above the horizontal plane 126 is an uphill plane 150 spaced apart therefrom by an uphill angle 151, and in contrast, shown below the horizontal plane 126 is a downhill plane 154 spaced apart therefrom by a downhill angle 155. The uphill plane 150 and downhill plane 154 symbolize the machine 106 being positioned uphill and downhill, respectively. For example, if the machine 106 is travelling uphill on a work site or field, then the machine 106 is positioned uphill, at that particular time. In contrast, if the machine 106 is travelling downhill, then the machine 106 is positioned downhill. The description and related illustrations focus on the machine 106 traveling uphill. However, the same principals would also apply to the machine 106 traveling downhill, even though such examples are not shown and discussed in detail.

Figure 2:
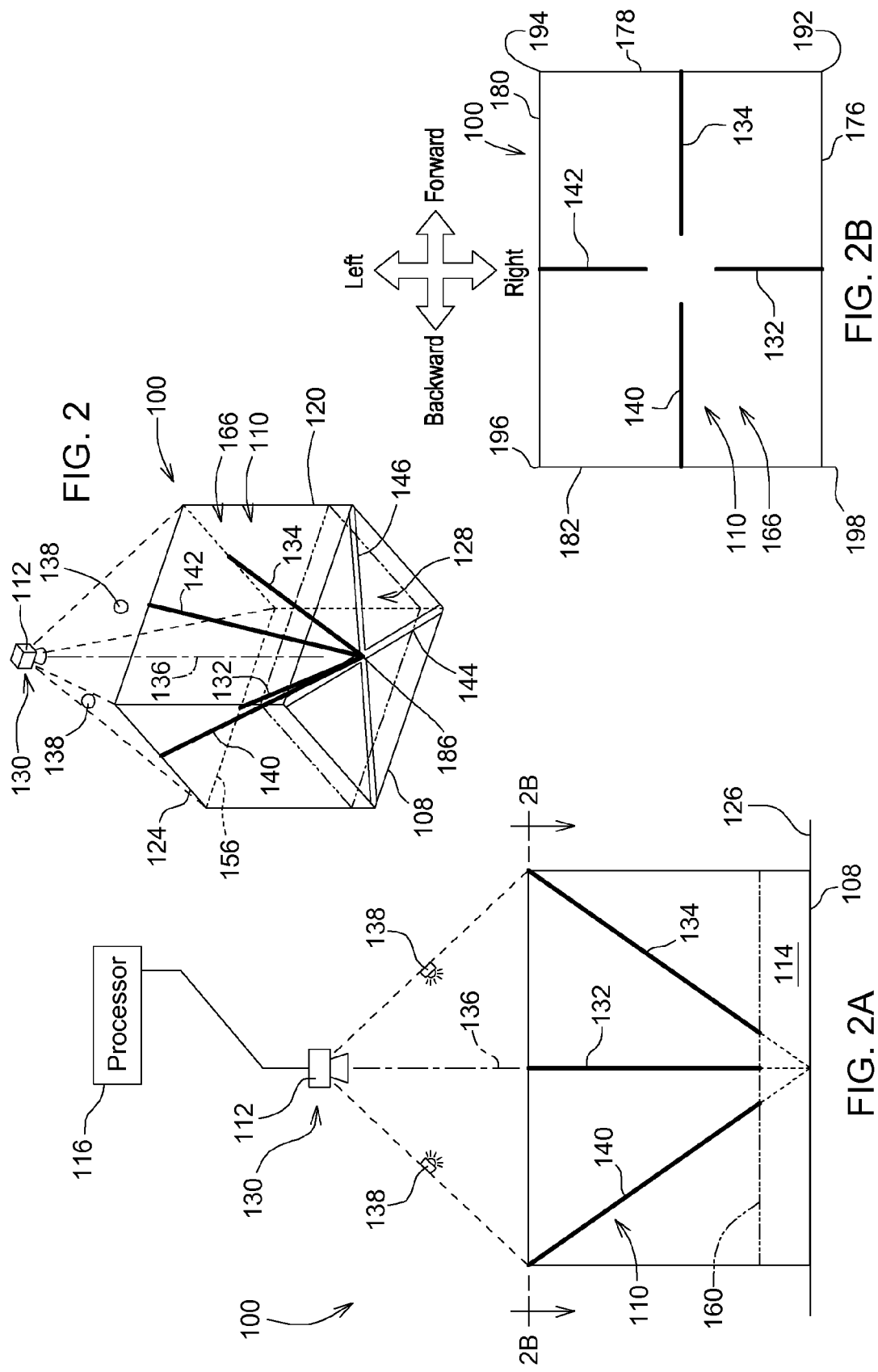
FIG. 2 is a perspective view of the first system being shown in a level position having a low level of liquid therein.

As shown in FIG. 2, the first system 100 includes a container 120, an imaging structure 110, an image capturing device 112, and a processor 116. Further, in FIG. 2A, there is shown an elevational view of the first system 100 in a level position and having a low level of the liquid 114 therein. Still further, in FIG. 2B, there is shown a top sectional view taken along lines 2B of FIG. 2A, illustrating a top view of the container 120 and the liquid 114 therein. The container 120 at least partially surrounds the liquid 114. The liquid 114 has a liquid surface 160 that is defined by a quantity of the liquid 114 in the container 120, a shape of the container 120, and an orientation of the container 120 relative to the horizontal plane 126. The imaging structure 110 is positioned in the container 120. The image capturing device 112, used for capturing an image of the liquid surface 160 and the imaging structure 110, is positioned in the container 120 and is spaced apart from the imaging structure 110. The processor 116 is, in communication with the image capturing device 112, for analyzing a characteristic of the image and for determining an attribute of the liquid, for example, therefrom.

A light source 130 is positioned so as to illuminate and enhance the image of the liquid surface 160 being captured by the image capturing device 112. The light source 130 is shown having a pair of light elements 138. The light source 130 may take a variety of different forms, however, including having greater or fewer light elements 138. Further, the light source 130 may be an incandescent light, a halogen light, a fluorescent light, or an LED light, to name just a few examples. The processor 116 is in communication with the image capturing device 112 for analyzing a characteristic of the image and for determining an attribute of the liquid 114 therefrom.

The attribute of the liquid 114 may be, for example, the quantity thereof. To illustrate, if the liquid 114 is a fuel, the quantity of the liquid 114 is indicative of how much longer the machine 106 may operate for the given quantity thereof, and it also indicative of when additional fuel may need to be added to the machine 106. As yet another example, the attribute of the liquid 114 may be an orientation of the liquid surface 160 relative to the container 120, and in such a case, the processor 116 may determine an orientation of the machine 106 relative to the horizontal plane 126, based on the orientation of the liquid surface 160 relative to the container 120. Knowing the orientation of the machine 106 may be useful for knowing, for example, when and how to shift a transmission (not shown) of the machine 106, or for knowing how much power must be produced for the machine 106 to operate effectively.

The imaging structure 110 includes an imaging member, such as a first imaging member 132, having an imaging member axis, the imaging member axis being an axis that is in alignment with the first imaging member 132. Similarly, the image capturing device 112 has a line of sight axis 136. In such an embodiment, the imaging member axis may be positioned out of alignment with the line of sight axis 136. As shown in the illustrated embodiment, the first imaging member 132 extends between a base 108 of the container 120 and a first edge 156, the first edge 156 being formed by a first side 176 and a top 124 of the container 120. The first imaging member 132 may be made steel or plastic, for example, and it may take a variety of shapes (e.g., rod shaped, as is shown).

Further, in the embodiment shown, the base 108 of the container 120 includes a base indicia 128, and the image includes at least a portion of the base indicia 128 when the liquid 114 is low enough that it does not cover an entirety of the base 108. When the liquid 114 is this low, the characteristic of the image includes the portion of the base indicia 128, and the processor 116 may analyze the portion of the base indicia 128, from the image, and may determine the attribute of the liquid 114 at least partially therefrom. The imaging structure 110 and the base indicia 128 cooperate such that the image is indicative of the attribute of the liquid 114, regardless of the level and orientation thereof. Otherwise, in some embodiments, the imaging structure 110 could have "blind spots" that are not accurately indicative of the level and orientation of the liquid 114, based on the image of the liquid surface 160, as viewed from the image capturing device 112.

As illustrated, the base indicia 128 may have a first indicia element 144 and a second indicia element 146. The first indicia element 144 extends between a first corner 192 and a third corner 196, and the second indicia element 146 extends between a second corner 194 and a fourth corner 198. By having the first indicia element 144 and the second indicia element 146 extending as such, the liquid 114 always intersects at least one of the first indicia element 144 and the second indicia element 146. As such, the image captured by the image capturing device 112 provides useful information about the attributes of the liquid 114, regardless of the orientation of the machine 106 and the level of the liquid 114. The first indicia element 144 and the second indicia element 146 may be reflective strips or strips that are otherwise in visual contrast to the base 108, for example. Other embodiments may have greater or fewer indicia elements and they may be positioned differently.

In some operating modes, an intersection of the liquid surface 160 and the imaging structure 110 defines a portion of the imaging structure 110 above the liquid surface 160 (i.e., when the liquid 114 is high enough to intersect the imaging structure 110). The characteristic of the image may be the portion of the imaging structure 110 positioned above the liquid surface 160, at a particular point in time. The processor 116 may analyze the portion of the imaging structure 110 above the liquid surface 160, from the image, and it may determine the attribute of the liquid 114 at least partially therefrom. As viewed by the image capturing device 112, the portion of the imaging structure 110 is an only portion for a given combination of the quantity of the liquid 114 in the container 120 and the orientation of the liquid surface 160 relative to the imaging structure 110.

In some other operating modes, the image also includes at least a portion of the base indicia 128 when the liquid 114 is low enough that it does not cover an entirety of the base 108. In such a mode, the characteristic of the image includes the portion of the base indicia 128, and the processor 116 may analyze the base indicia 128, from the image, and determine the attribute of the liquid 114 therefrom. As viewed by the image capturing device 112, the portion of the imaging structure 110 and the portion of the base indicia 128 are the only portions for a given combination of (1) the quantity of the liquid 114 in the container 120, and (2) the orientation of the liquid surface 160 relative to the imaging structure 110.

As shown, the plurality of imaging members 166 may specifically include a first imaging member 132, a second imaging member 134, a third imaging member 140, and a fourth imaging member 142. The first imaging member 132 extends between the base 108 and a first side 176 of the container 120. Further, the second imaging member 134 extends between the base 108 and a second side 178 of the container 120. Further yet, the third imaging member 140 extends between the base 108 and a third side 180 of the container 120. And still further, the fourth imaging member 142 extends between the base 108 and a fourth side 182 of the container 120. Each of the plurality of imaging members 166 has an end, and the ends thereof meet at, or substantially near, the base 108 of the container 120 at a base meeting location 186. As illustrated, the base 108 and the plurality of imaging members 166 may define a pyramid. In other embodiments of the first system 100, the plurality of imaging members 166 could be greater or fewer and could also be positioned differently. In alternative to or in addition to, the base 108 of the container 120 may be sloped, such that the liquid 114 always flows to the base meeting location 186 and intersects the imaging structure 110.

Figure 3:
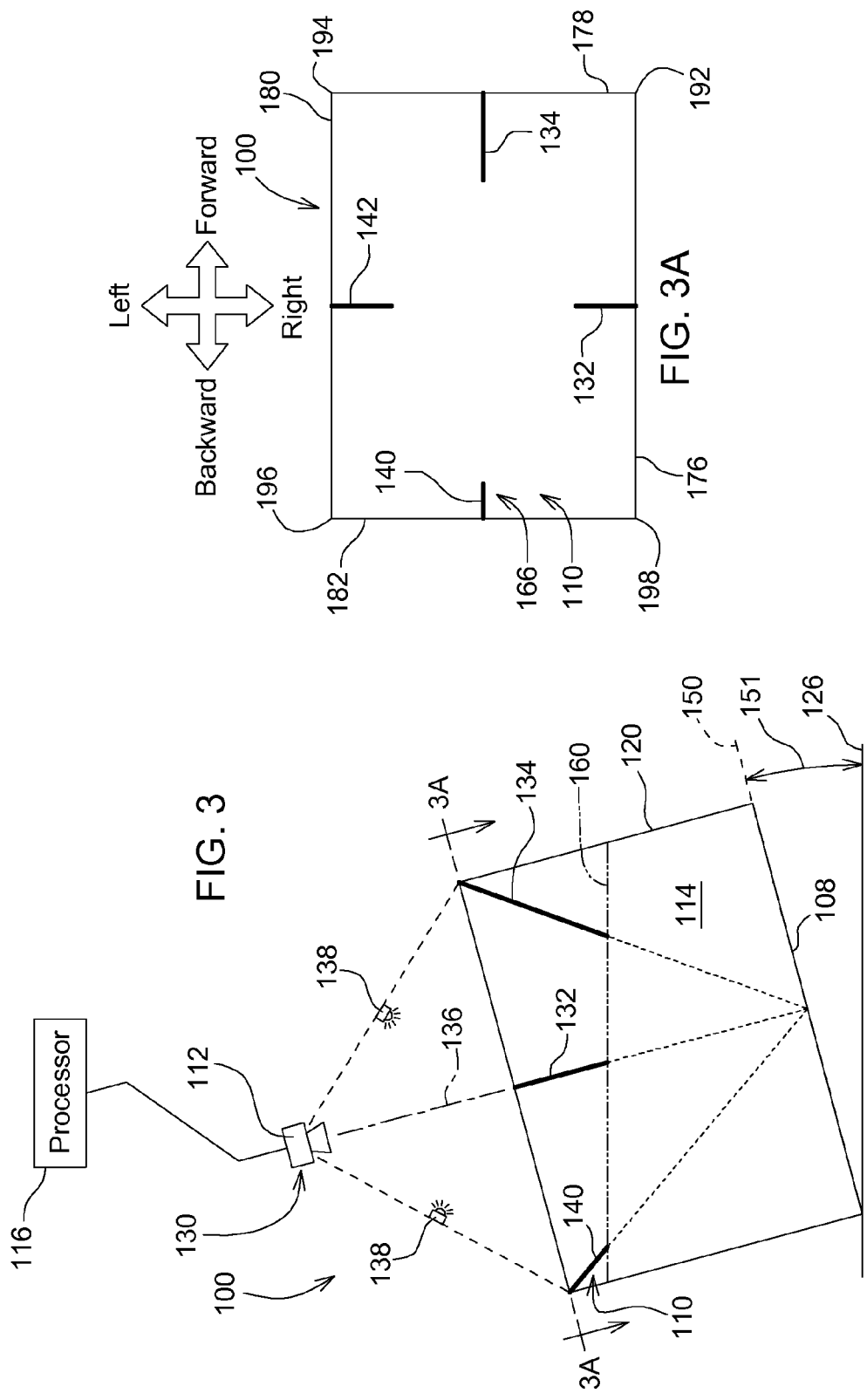
FIG. 3 is an elevational view of the first system being shown in an upward position and having a high level of liquid therein.

Referring to FIG. 3, there is shown an elevational view of the first system 100 being shown in an upward position and having a high level of the liquid 114 therein. FIG. 3A illustrates an elevational view taken along lines 3A of FIG. 3, showing a top view of the container 120 and the liquid 114 therein. In FIG. 3a, a portion of the imaging structure 110 is above the liquid surface 160. From the image, the processor 116 may analyze the portion of the imaging structure 110 that is positioned above the liquid surface 160, and may determine the attribute of the liquid 114 at least partially therefrom. The view shown in the image is indicative of the first system 100 being in the upward position and having a high level of the liquid 114 therein, as shown in FIGS. 3 and 3A.

Figure 4:
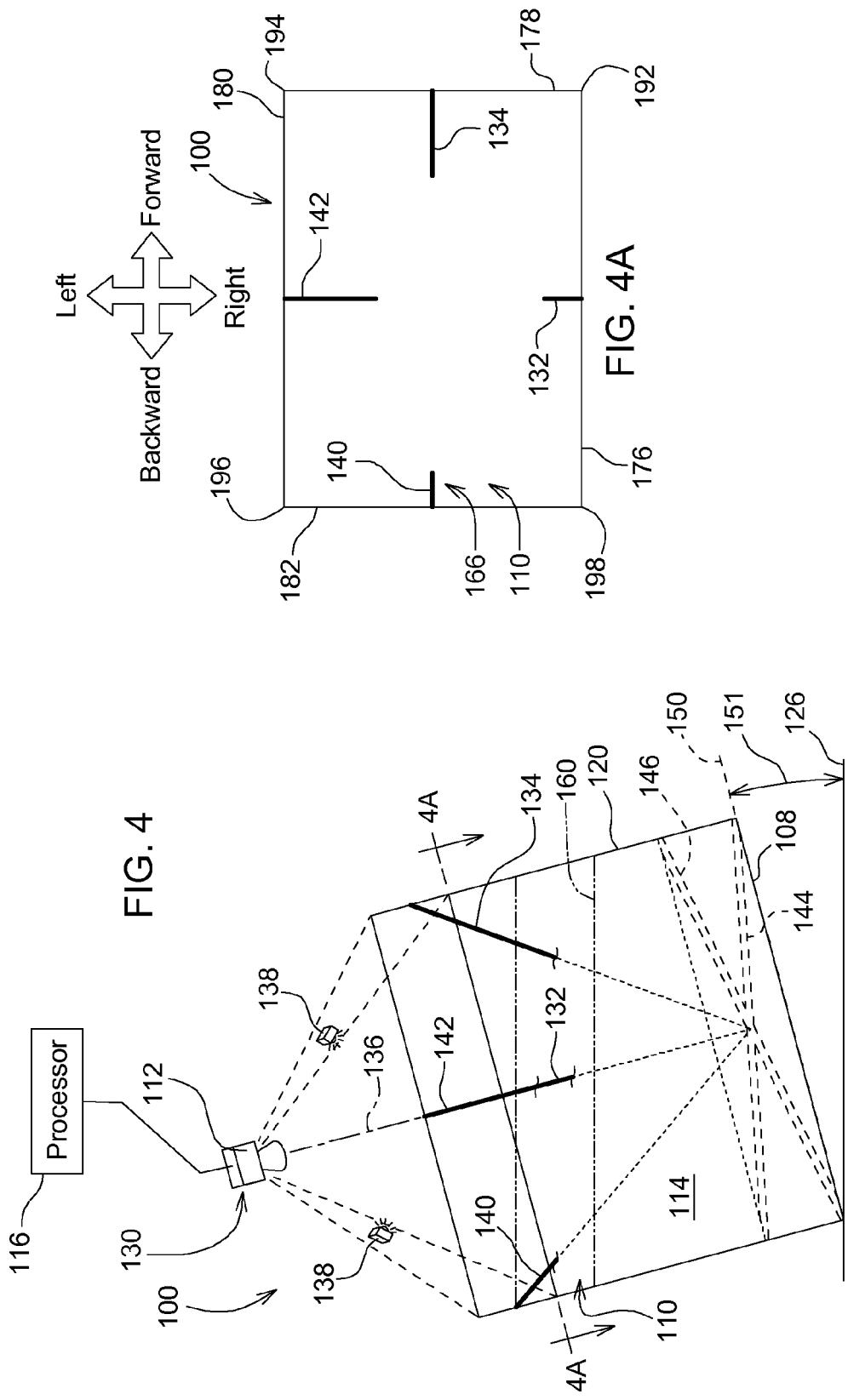
FIG. 4 is a side view of the first system being shown in an upward and rightward position and having a medium level of liquid therein.

Next, referring to FIG. 4, there is shown a side view of the first system 100 being shown in an upward and rightward position and having a medium level of liquid 114 therein. FIG. 4A illustrates a top sectional view taken along lines 4A of FIG. 4, showing a top view of the container 120 and the liquid 114 therein. In FIG. 4A, a portion of the imaging structure 110 and a portion of the base indicia 128 are above the liquid surface 160. Using the image, the processor 116 may analyze the portion of the imaging structure 110 and the portion of the base indicia 128 that are positioned above the liquid surface 160, and may determine the attribute of the liquid 114 at least partially therefrom. The view shown in the image is indicative of the first system 100 being in the upward and rightward position, and is further indicative of having a medium level of the liquid 114 therein.

Further, referring to FIG. 5, there is shown a side view of the first system 100 being in an upward and rightward position and having a low level of the liquid 114 therein. FIG. 5A shows is a top sectional view taken along lines 5A of FIG. 5 and illustrates a top view of the container 120 and the liquid 114 therein. In FIG. 5A, a portion of the imaging structure 110 and a portion of the base indicia 128 are above the liquid surface 160. Using the image, the processor 116 analyzes the portion of the imaging structure 110 and the portion of the base indicia 128 that are positioned above the liquid surface 160, and determines the attribute of the liquid 114 at least partially therefrom. The view shown in the image is indicative of the first system 100 being in the upward and rightward position and having a low level of the liquid 114 therein.

Referring to FIG. 6, there is shown a second system 200, being shown in a level position and having a low level of liquid 114 therein. Referring to FIG. 6A, there is shown an elevational view of the second system 200 being shown in a level position and having a low level of the liquid 114 therein. And referring to FIG. 6B, there is shown a top sectional view taken along lines 6B of FIG. 6A, showing a top view of the container 120 and the liquid 114 therein. In the second system 200, the imaging structure 110 has an inverse imaging structure 218 that includes a plurality of inverse imaging members 288, each of which has an inverse imaging member axis. The inverse imaging member axes are in alignment with each of the plurality of imaging members 166, respectively. The image capturing device 112 has a line of sight axis 136. As shown, each of the imaging member axes may be positioned out of alignment with the line of sight axis 136.

The plurality of inverse imaging members 288 includes a first inverse imaging member 268, a second inverse imaging member 270, a third inverse imaging member 272, and a fourth inverse imaging member 274. The first inverse imaging member 268 extends between a top 124 of the container 120 and the first corner 192 of the base 108. Further, the second inverse imaging member 270 extends between the top 124 of the container 120 and the second corner 194 of the base 108. Further yet, the third inverse imaging member 272 extends between the top 124 of the container 120 and the third corner 196 of the base 108. Still further, the fourth inverse imaging member 274 extends between the top 124 of the container 120 and the fourth corner 198 of the base 108. Each of the plurality of inverse imaging members 288 has an end, and the ends of thereof meet at, or substantially near, the top 124 of the container 120 at a meeting location 290. As illustrated, the top 124 and the plurality of inverse imaging members 288 may define a pyramid. By having the inverse imaging structure 218 extending to the corners of the base 108, the liquid 114 intersects either the imaging structure 110 or the inverse imaging structure 218. In such an embodiment, the image captured by the image capturing device 112 provides useful information about the attributes of the liquid 114, regardless of the orientation of the machine 106 and the level of the liquid 114.

An intersection of the liquid surface 160 and the inverse imaging structure 218 defines a portion of the inverse imaging structure 218 above the liquid surface 160 when the liquid 114 is high enough to intersect the inverse imaging structure 218. In some operating modes, the characteristic of the image includes the portion of the inverse imaging structure 218 above the liquid surface 160. The processor 116 analyzes the portion of the inverse imaging structure 218 above the surface, from the image, and is determines the attribute of the liquid 114 therefrom. As discussed above, the attribute of the liquid 114 may be at least one of the quantity of the liquid 114 and the orientation of the liquid surface 160 relative to the container 120, for example.

In some other operating modes, the characteristic of the image includes the portion of the imaging structure 110 and also includes the portion of the inverse imaging structure 218, assuming that they are both above the liquid surface 160. In such an operating mode, the processor 116 analyzes the portion of the inverse imaging structure 218 above the liquid surface 160 and the portion of the inverse imaging structure 218 above the liquid surface 160. Then, from analyzing the image, the processor 116 may determine the attribute of the liquid 114 therefrom. Here, too, the attribute of the liquid 114 may be at least one of, for example, the quantity of the liquid 114 and the orientation of the liquid surface 160 relative to the container 120.

Referring to FIG. 7, there is shown an elevational view of the second system 200 being shown in an upward position and having a medium level of the liquid 114 therein. FIG. 7A illustrates a top sectional view taken along lines 7A of FIG. 7, showing a top view of the container 120 and the liquid 114 therein. In FIG. 7A, only a portion of the imaging structure 110 is above the surface. Using the image, the processor 116 analyzes this particular portion of the imaging structure 110 positioned above the liquid surface 160, and determines the attribute of the liquid 114 at least partially therefrom. The view shown in the image is indicative of the second system 200 being in the upward position and having a medium level of liquid 114 therein.

Referring to FIG. 8, there is shown a side view of the second system 200 being shown in an upward and rightward position and having a medium level of the liquid 114 therein.

And shown in FIG. 8A, there is a top sectional view taken along lines 8A of FIG. 8, illustrating a top view of the container 120 and the liquid 114 therein. As shown in FIG. 8A, a portion of the imaging structure 110 is above the surface, some of which is the inverse imaging structure 218. Using the image, the processor 116 may analyze this particular portion of the imaging structure 110 that is positioned above the liquid surface 160, and it may determine the attribute of the liquid 114 at least partially therefrom. Ultimately, the view shown in the image is indicative of the second system 200 being in the upward and rightward position and having a medium level of the liquid 114 therein.

Finally, referring to FIG. 9, there is shown a side view of the second system 200, being in an upward and rightward position and having a low level of the liquid 114 therein. In addition, FIG. 9A illustrates a top sectional view—taken along lines 9A of FIG. 9—showing a top view of the container 120 and the liquid 114 therein. As shown in FIG. 9A, a portion of the imaging structure 110 is above the surface, some of which is the inverse imaging structure 218. Using the image, the processor 116 may analyze this particular portion of the imaging structure 110 that is positioned above the liquid surface 160, and it may determine an attribute of the liquid 114 at least partially therefrom. The view shown in the image is indicative of the second system 200 being in the upward and rightward position and having a low level of the liquid 114 therein.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A system, comprising:
   a container configured to at least partially surround a liquid, the liquid having a liquid surface that is defined by a quantity of the liquid in the container, a shape of the container, and an orientation of the container relative to a horizontal plane;
   an imaging structure positioned in the container;
   an image capturing device positioned in the container and spaced apart from the imaging structure, the image capturing device being configured to capture an image of the liquid surface and the imaging structure; and
   a processor in communication with the image capturing device, the processor being configured to analyze a characteristic of the image and configured to determine an attribute of the liquid therefrom, wherein:
   an intersection of the liquid surface and the imaging structure defines a portion of the imaging structure above the liquid surface when the liquid is high enough to intersect the imaging structure, the characteristic of the image includes the portion of the imaging structure above the liquid surface, and the processor is configured to analyze the portion of the imaging structure above the liquid surface, from the image, and is configured to determine the attribute of the liquid therefrom; and
   as viewed by the image capturing device, the portion of the imaging structure is an only portion for a given combination of the quantity of the liquid in the container and the orientation of the liquid surface relative to the imaging structure.

2. The system of claim 1, comprising a light source positioned so as to illuminate and enhance the image of the liquid surface and the imaging structure that is captured by the image capturing device, and wherein the image capturing device is a camera.

3. The system of claim 1, wherein the attribute of the liquid is the quantity of the liquid.

4. The system of claim 1, wherein the attribute of the liquid is an orientation of the liquid surface relative to the container, and the processor is configured to determine an orientation of a machine relative to the horizontal plane based on the orientation of the liquid surface relative to the container.

5. The system of claim 1, wherein the imaging structure comprises an imaging member having an imaging member axis, the image capturing device having a line of sight axis, the imaging member axis being positioned out of alignment with the line of sight axis.

6. The system of claim 5, wherein the imaging member extends between a base of the container and an edge, and the edge is formed by a side of the container and a top of the container.

7. The system of claim 1, wherein a base of the container comprises a base indicia, and the image includes at least a portion of the base indicia when the liquid is low enough that it does not cover an entirety of the base, the characteristic of the image includes the portion of the base indicia, and the processor is configured to analyze the portion of the base indicia, from the image, and is configured to determine the attribute of the liquid therefrom.

8. The system of claim 7, wherein the base indicia comprises a first indicia element and a second indicia element, the first indicia element extends between a first corner of the base and a third corner of the base, the second indicia element extends between a second corner of the base and a fourth corner of the base, and the image includes at least one of the first indicia element and the second indicia element when the liquid is low enough that it does not cover the entirety of the base.

9. The system of claim 8, wherein the first indicia element and the second indicia element are reflective strips.

10. The system of claim 1, wherein a base of the container comprises a base indicia, and the image includes at least a portion of the base indicia when the liquid is low enough that it does not cover an entirety of the base, the characteristic of the image includes the portion of the base indicia, and the processor is configured to analyze the base indicia, from the image, and is configured to determine the attribute of the liquid therefrom.

11. The system of claim 10, wherein as viewed by the image capturing device, the portion of the imaging structure and the portion of the base indicia are the only portions for a given combination of the quantity of the liquid in the container and the orientation of the liquid surface relative to the imaging structure.

12. The system of claim 1, wherein the imaging structure comprises an upright imaging structure, the upright imaging structure comprising a plurality of imaging members having imaging member axes, the image capturing device having a line of sight axis, each of the imaging member axes are positioned out of alignment with the line of sight axis, the plurality of imaging members comprises a first imaging member, a second imaging member, a third imaging member, and a fourth imaging member, the first imaging member extends between a base of the container and a first side of the container, the second imaging member extends between the base of the container and a second side of the container, the third imaging member extends between the base of the container and a third side of the container, and the fourth imaging member extends between the base of the container and a fourth side of the container.

13. The system of claim 12, wherein a first end of the first imaging member extends away from a first corner of the base, a second end of the second imaging member extends away from a second corner of the base, a third end of the third imaging member extends between the away from a third corner of the base, and a fourth end of the fourth imaging member extends between the away from a fourth corner of the base.

14. The system of claim 13, wherein each of the plurality of imaging members has an end, and the ends of the plurality of imaging members meet at the base of the container.

15. The system of claim 12, wherein the imaging structure comprises an inverse imaging structure, the inverse imaging structure comprising a plurality of inverse imaging members having inverse imaging member axes, each of the inverse imaging member axes is positioned out of alignment with the line of sight axis, the plurality of inverse imaging members comprises a first inverse imaging member, a second inverse imaging member, a third inverse imaging member, and a fourth inverse imaging member, the first inverse imaging member extends between a top of the container and a first corner of the container, the second inverse imaging member extends between the top of the container and a second corner of the container, the third inverse imaging member extends between the top of the container and a third corner of the container, and the fourth inverse imaging member extends between the top of the container and a fourth corner of the container.

16. The system of claim 15, wherein each of the plurality of inverse imaging members has an end, and the ends of the plurality of inverse imaging members meet at or substantially near the top of the container.

17. The system of claim 15, wherein an intersection of the liquid surface and the inverse imaging structure defines a portion of the inverse imaging structure above the liquid surface when the liquid is high enough to intersect the inverse imaging structure, the characteristic of the image includes the portion of the inverse imaging structure above the liquid surface, and the processor is configured to analyze the portion of the inverse imaging structure above the liquid surface, from the image, and is configured to determine the attribute of the liquid therefrom.

18. The system of claim 15, wherein:
   an intersection of the liquid surface and the upright imaging structure defines a portion of the upright imaging structure above the liquid surface when the liquid is high enough to intersect the imaging structure;
   an intersection of the liquid surface and the inverse imaging structure defines a portion of the inverse imaging structure above the liquid surface when the liquid is high enough to intersect the inverse imaging structure; and
   the characteristic of the image includes the portion of the upright imaging structure and the portion of the inverse imaging structure above the liquid surface, and the processor is configured to analyze the portion of the upright imaging structure above the liquid surface and the portion of the inverse imaging structure above the liquid surface, from the image, and to determine the attribute of the liquid therefrom.

* * * * *